US010056800B2

(12) United States Patent
Fischer et al.

(10) Patent No.: US 10,056,800 B2
(45) Date of Patent: Aug. 21, 2018

(54) FLUID DELIVERY MODULE

(71) Applicant: DELPHI TECHNOLOGIES IP LIMITED, St. Michael (BB)

(72) Inventors: John G. Fischer, Goodrich, MI (US); Douglas M. Laskowski, Cheasaning, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 454 days.

(21) Appl. No.: 14/813,386

(22) Filed: Jul. 30, 2015

(65) Prior Publication Data

US 2017/0030358 A1 Feb. 2, 2017

(51) Int. Cl.
| *F04D 13/08* | (2006.01) |
| *F02M 37/08* | (2006.01) |
| *F02M 37/10* | (2006.01) |
| *F02M 37/22* | (2006.01) |
| *H02K 5/12* | (2006.01) |

(Continued)

(52) U.S. Cl.
CPC ............... *H02K 5/12* (2013.01); *F02M 37/08* (2013.01); *F02M 37/10* (2013.01); *F02M 37/106* (2013.01); *F02M 37/22* (2013.01); *F04D 1/00* (2013.01); *F04D 13/086* (2013.01); *F04D 29/22* (2013.01); *F04D 29/4293* (2013.01); *H01R 39/385* (2013.01); *H02K 5/143* (2013.01); *F02M 2037/082* (2013.01); *F02M 2037/225* (2013.01);

(Continued)

(58) Field of Classification Search
CPC ....... F04D 13/08; F04D 13/086; F02M 37/08; F02M 37/10; F02M 37/106; F02M 37/22; F02M 2037/225; F02M 2037/228
See application file for complete search history.

(56) References Cited

U.S. PATENT DOCUMENTS 3,676,025 A * 7/1972 Shultz .................... F02M 37/08
222/333
4,218,196 A * 8/1980 Ohnishi .................. F02M 37/08
417/366

(Continued)

FOREIGN PATENT DOCUMENTS

| DE | 19639009 A1 | 3/1997 |
| DE | 102007052747 A1 | 5/2009 |

(Continued)

*Primary Examiner* — Peter J Bertheaud
(74) *Attorney, Agent, or Firm* — Joshua M. Haines

(57) ABSTRACT

A fluid delivery module includes a housing with a housing interior volume, the housing defining a first brush compartment and a second brush compartment within the housing interior volume; an inlet which introduces fluid into the housing interior volume; an outlet which discharges fluid from the housing interior volume; a fluid pump within the housing interior volume and having a pump section and a motor assembly which receives electric power through a first carbon brush and a second carbon brush such that the first carbon brush is received within a first carbon brush holder of the motor assembly and the second carbon brush is received within a second carbon brush holder of the motor assembly; and a filter within the housing interior volume which circumferentially surrounds the fluid pump. The first brush compartment encloses the first carbon brush holder and the second brush compartment encloses the second carbon brush holder.

10 Claims, 6 Drawing Sheets

(51) Int. Cl.
*F04D 1/00* (2006.01)
*F04D 29/22* (2006.01)
*F04D 29/42* (2006.01)
*H01R 39/38* (2006.01)
*H02K 5/14* (2006.01)
*F04D 13/06* (2006.01)

(52) U.S. Cl.
CPC ... *F02M 2037/228* (2013.01); *F04D 13/0693* (2013.01)

(56) References Cited

U.S. PATENT DOCUMENTS

| | | | |
|---|---|---|---|
| 5,392,750 A * | 2/1995 | Laue | B01D 35/027 123/509 |
| 5,413,457 A * | 5/1995 | Tuckey | F04D 5/005 415/169.1 |
| 5,697,769 A * | 12/1997 | Kobman | F02M 37/08 417/410.1 |
| 5,875,816 A | 3/1999 | Frank et al. | |
| 5,961,293 A * | 10/1999 | Clemmons | F02M 37/10 417/410.4 |
| 6,047,685 A | 4/2000 | Schelhas et al. | |
| 6,073,614 A | 6/2000 | Kleppner | |
| 6,231,318 B1 * | 5/2001 | Cotton | B01D 35/027 123/509 |
| 6,267,103 B1 * | 7/2001 | Ludwig | B01D 35/027 123/509 |
| 6,361,684 B1 | 3/2002 | Hawkins et al. | |
| 6,807,948 B2 | 10/2004 | Kanamaru | |
| 6,880,569 B2 | 4/2005 | Kato | |
| 7,069,912 B2 * | 7/2006 | Yoshioka | B01D 29/906 123/509 |
| 8,297,260 B2 * | 10/2012 | Masuda | F02M 37/106 123/509 |
| 2006/0275163 A1 | 12/2006 | Pike | |
| 2008/0107549 A1 | 5/2008 | Crary et al. | |
| 2014/0314591 A1 | 10/2014 | Herrera et al. | |
| 2015/0104339 A1 | 4/2015 | Fischer et al. | |

FOREIGN PATENT DOCUMENTS

| | | |
|---|---|---|
| EP | 1584812 A1 | 10/2005 |
| EP | 2644877 A1 | 10/2013 |

* cited by examiner

FLUID DELIVERY MODULE

TECHNICAL FIELD OF INVENTION

The present invention relates to a fluid delivery module; more particularly to a fuel delivery module; and even more particularly to a fuel delivery module which includes a fuel pump and filter assembly such that the fuel pump and filter assembly includes a fuel pump located within a filter.

BACKGROUND OF INVENTION

Fluid pumps, and more particularly fuel pumps for pumping fuel, for example, from a fuel tank of a motor vehicle to an internal combustion engine of the motor vehicle, are known. It is common for the fuel pump to be part of a fuel delivery module which includes a fuel reservoir defining a reserve fuel volume within the fuel tank. The fuel pump is located within the fuel reservoir, thereby ensuring the fuel pump is exposed to fuel even when the fuel within the fuel tank is low or may shift within the fuel tank due to the motor vehicle operating on an incline or due to the motor vehicle navigating a turn at high speed. Such fuel pumps are known to be operated by an electric motor which rotates a pump section in order to pump fuel from the fuel reservoir to the internal combustion engine. In some fuel modules such as those shown in U.S. Pat. No. 6,807,948 to Kanamaru et al., U.S. Pat. No. 5,875,816 to Frank et al., U.S. Pat. No. 6,880,569 to Kato, U.S. Pat. No. 6,047,685 to Schelhas et al., U.S. Pat. No. 5,392,750 to Laue et al., and U.S. Pat. No. 6,073,614 to Kleppner, the electric motor of the fuel pump is circumferentially surrounded by a fuel filter. After the fuel has passed through the pump section of the fuel pump, the must pass through the filter prior to being communicated to the internal combustion engine, thereby preventing foreign matter that may be present in the fuel from being communicated to the internal combustion engine. While the preceding examples may be effective, continuous improvement in any art is always desirable.

SUMMARY OF THE INVENTION

Briefly described, a fluid delivery module includes a housing extending along a pump axis such that the housing defines a housing interior volume, the housing defining a first brush compartment and a second brush compartment within the housing interior volume; an inlet which introduces fluid into the housing interior volume; an outlet which discharges fluid from the housing interior volume; a fluid pump within the housing interior volume, the fluid pump having a pump section and a motor assembly which rotates about the pump axis such that rotation of the motor assembly causes the pump section to pump fuel from the inlet to the outlet, wherein the motor assembly receives electric power through a first carbon brush and a second carbon brush such that the first carbon brush is received within a first carbon brush holder of the motor assembly and the second carbon brush is received within a second carbon brush holder of the motor assembly; and a filter within the housing interior volume which circumferentially surrounds the fluid pump such that fluid that is pumped from the inlet to the outlet passes through the filter; wherein the first brush compartment encloses the first carbon brush holder and the second brush compartment encloses the second carbon brush holder, thereby electrically isolating the first carbon brush and the second carbon brush.

BRIEF DESCRIPTION OF DRAWINGS

This invention will be further described with reference to the accompanying drawings in which.

DETAILED DESCRIPTION OF INVENTION

Figure 1:
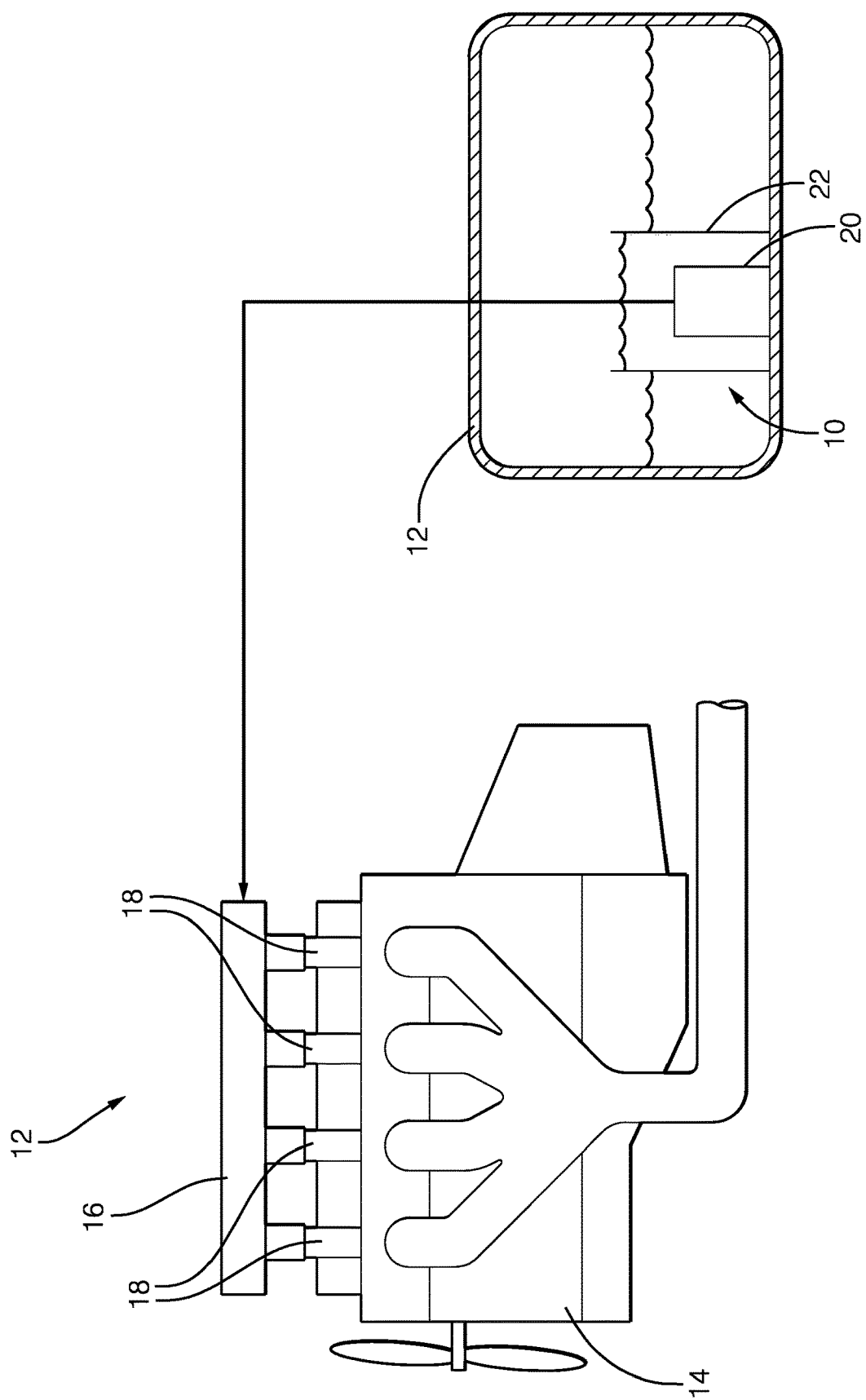
FIG. 1 is a schematic view of a fuel tank and fuel delivery module which supply fuel to an internal combustion engine.

Reference will first be made to FIG. 1 which shows a fluid delivery module, illustrated as fuel delivery module 10, which is used to supply fuel from a fuel tank 12 to a fuel consuming device, illustrated as internal combustion engine 14 for a motor vehicle. Fuel delivery module 10 is located within fuel tank 12 and supplies the fuel to a fuel rail 16 of internal combustion engine 14. A plurality of fuel injectors 18 are in fluid communication with fuel rail 16, thereby receiving fuel from fuel rail 16. Each fuel injector 18 is configured to meter a precise amount of fuel to a respective combustion chamber (not shown) of internal combustion engine 14 where the fuel is combusted in order to provide propulsion to the motor vehicle and drive other accessories, by way of non-limiting example, an air conditioning system, an electrical system, and power steering.

Figure 2:
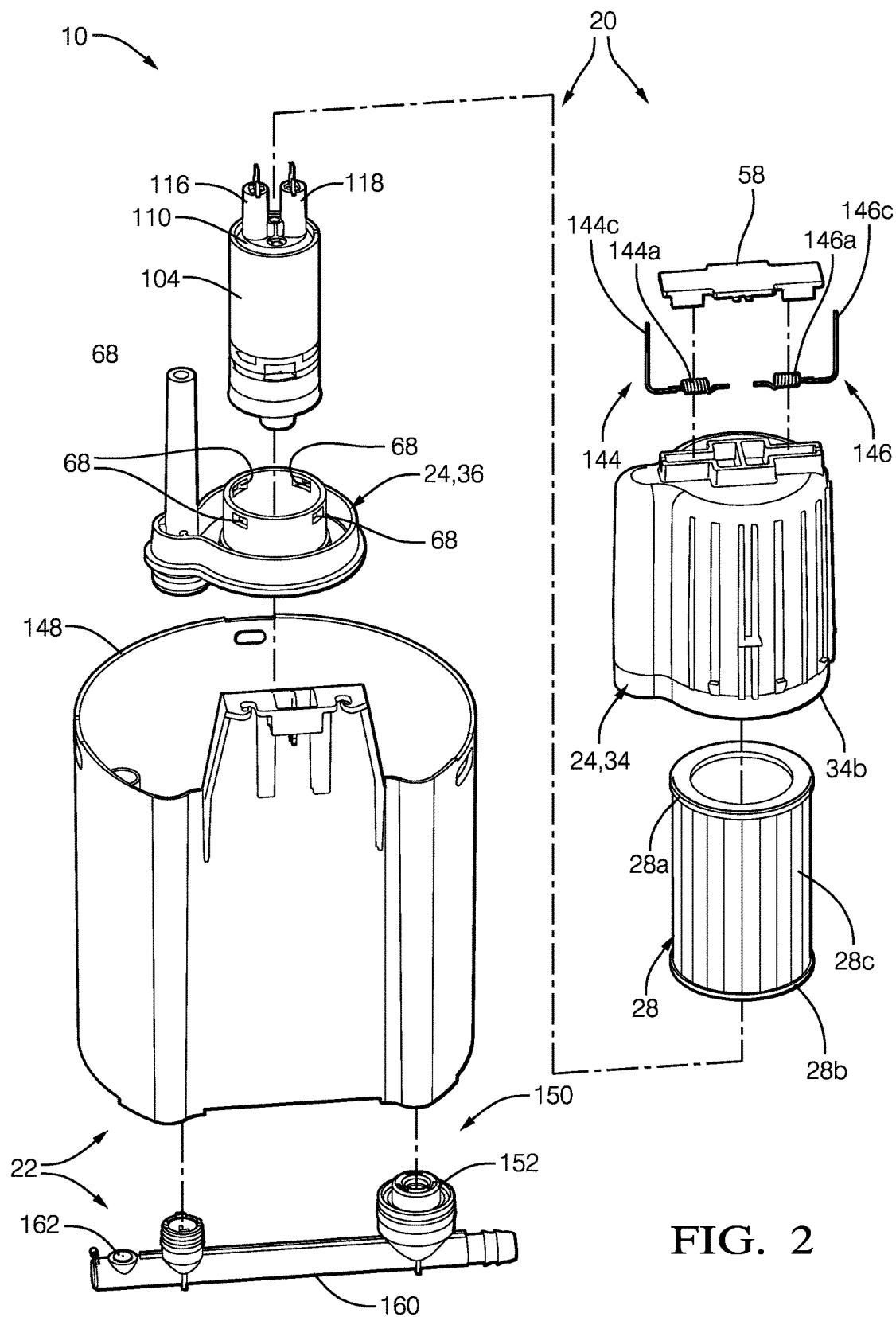
FIG. 2 is an exploded isometric view of the fuel delivery module of FIG. 1 in accordance with the present invention.
Figure 2A:
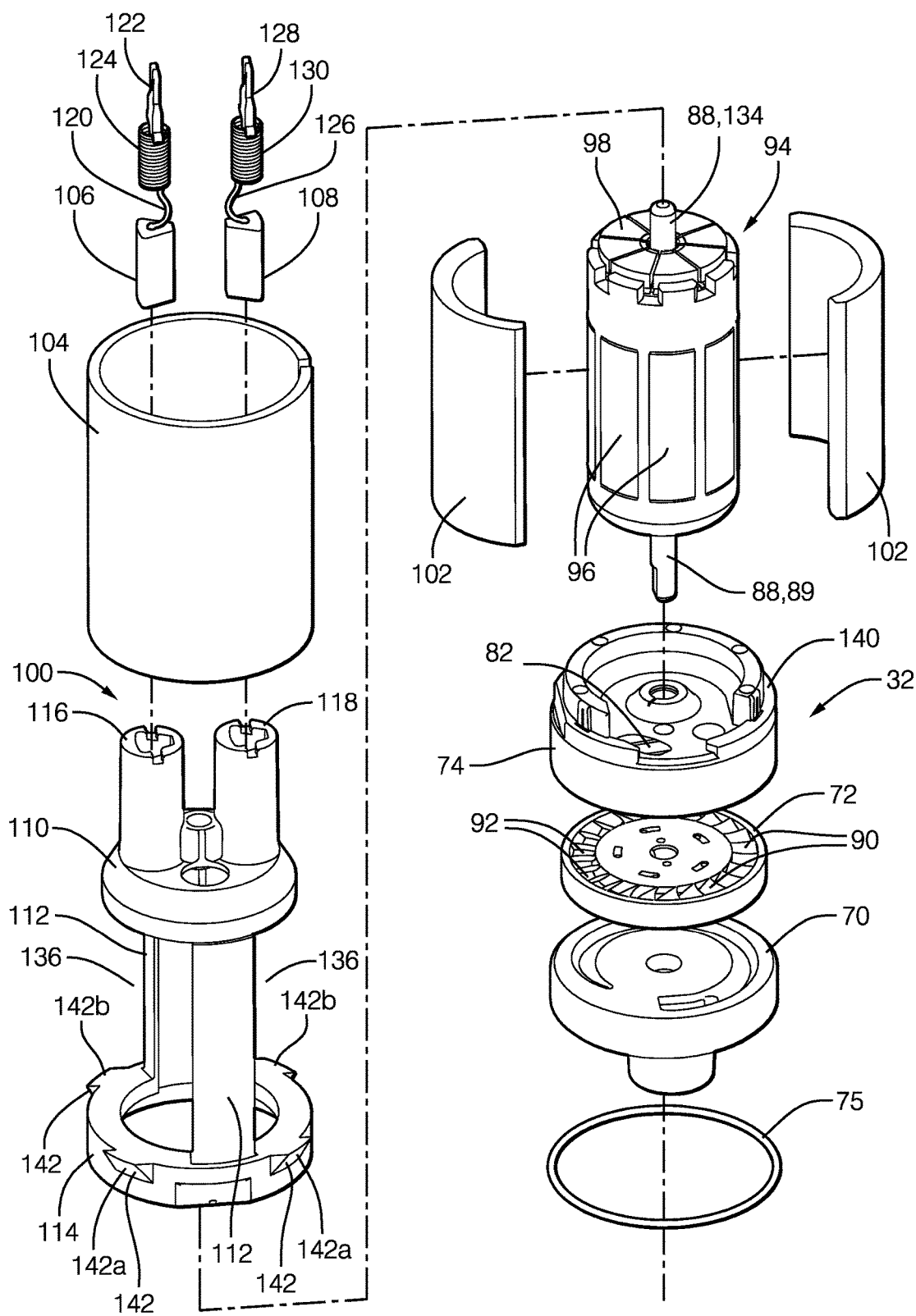
FIGS. 2A and 2B are exploded isometric views of portions of FIG. 2.
Figure 2B:
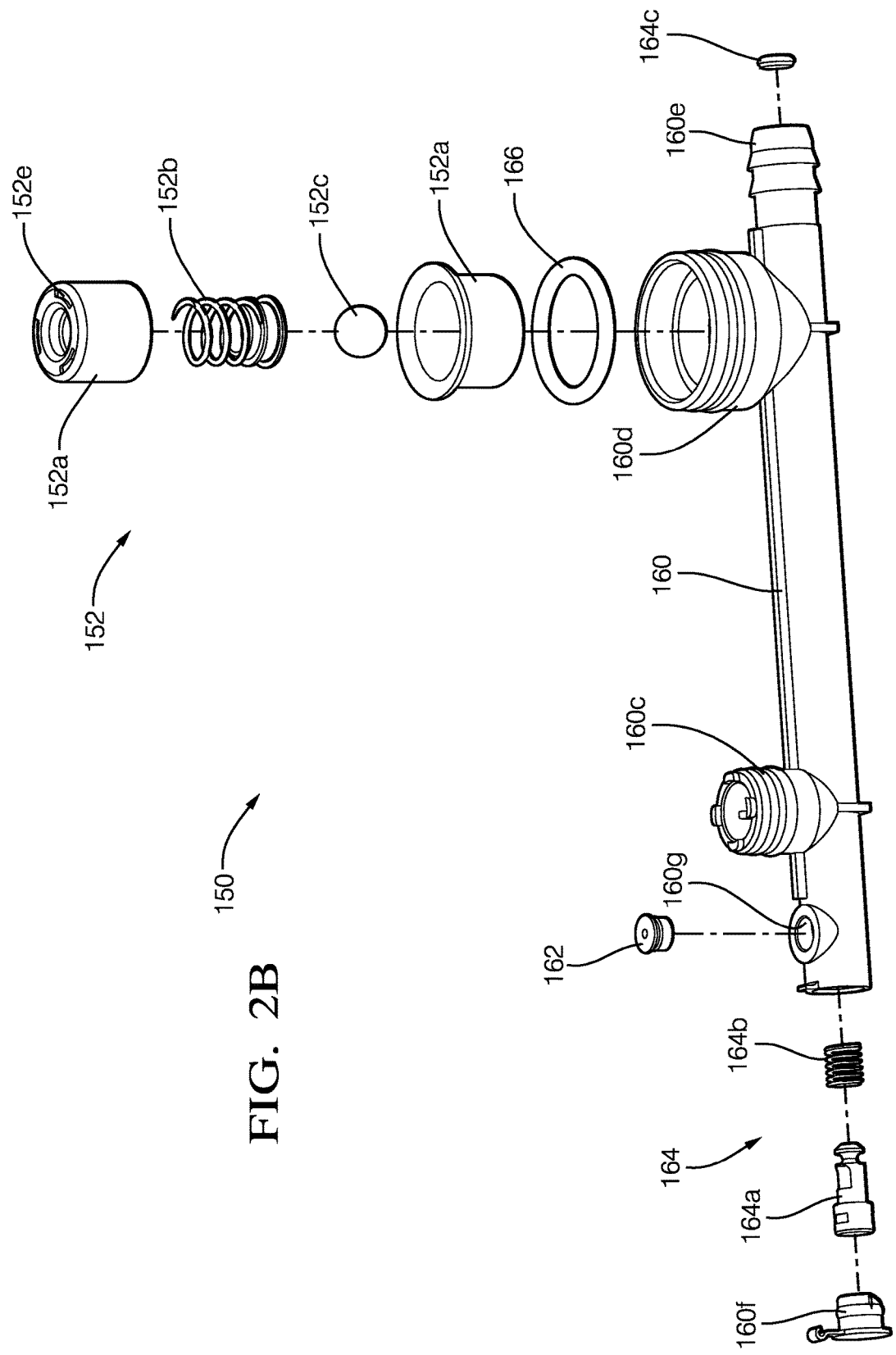
Figure 3:
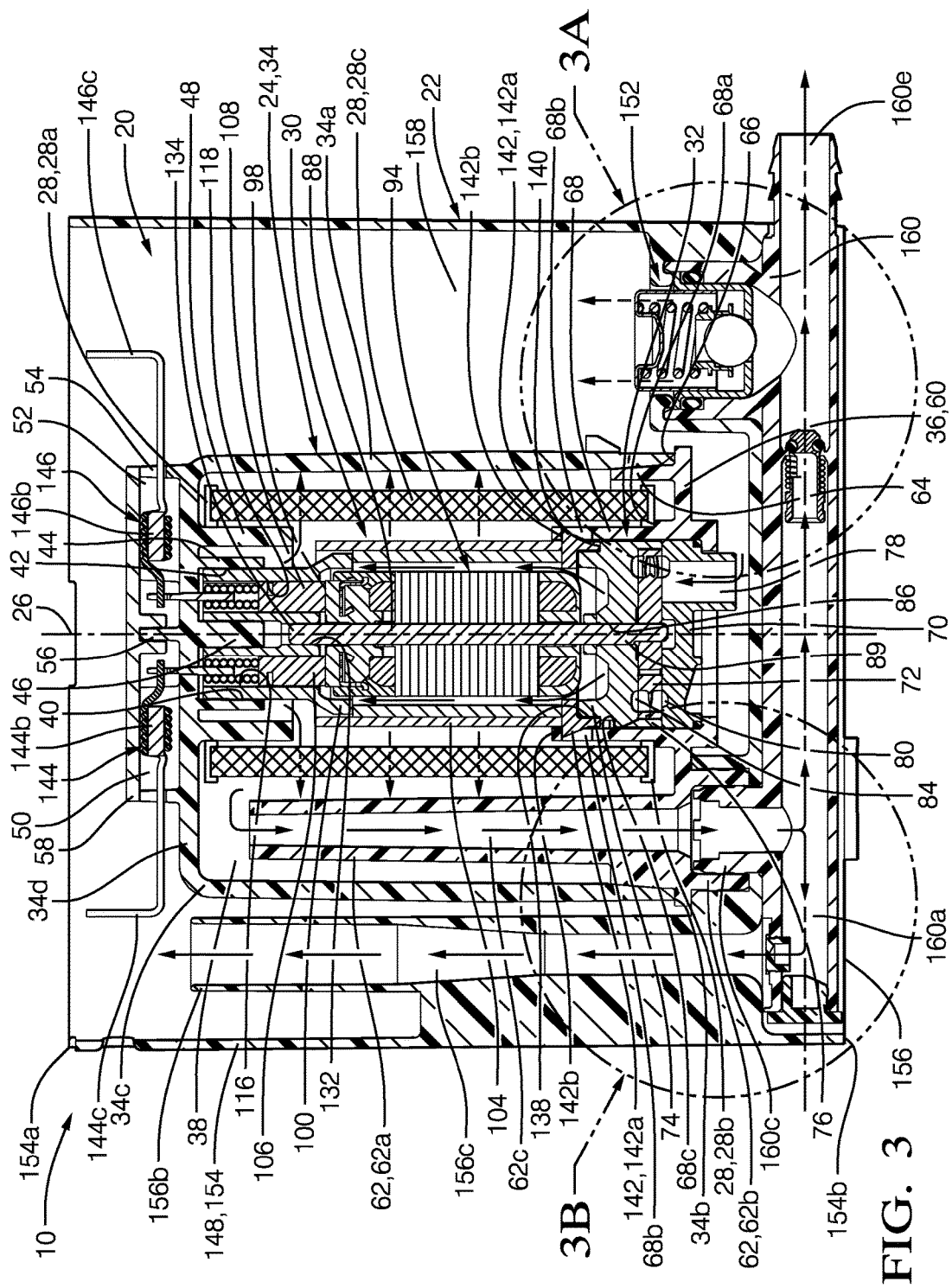
FIG. 3 is an axial-cross-sectional view of the fuel delivery module of FIG. 2.
Figure 3A:
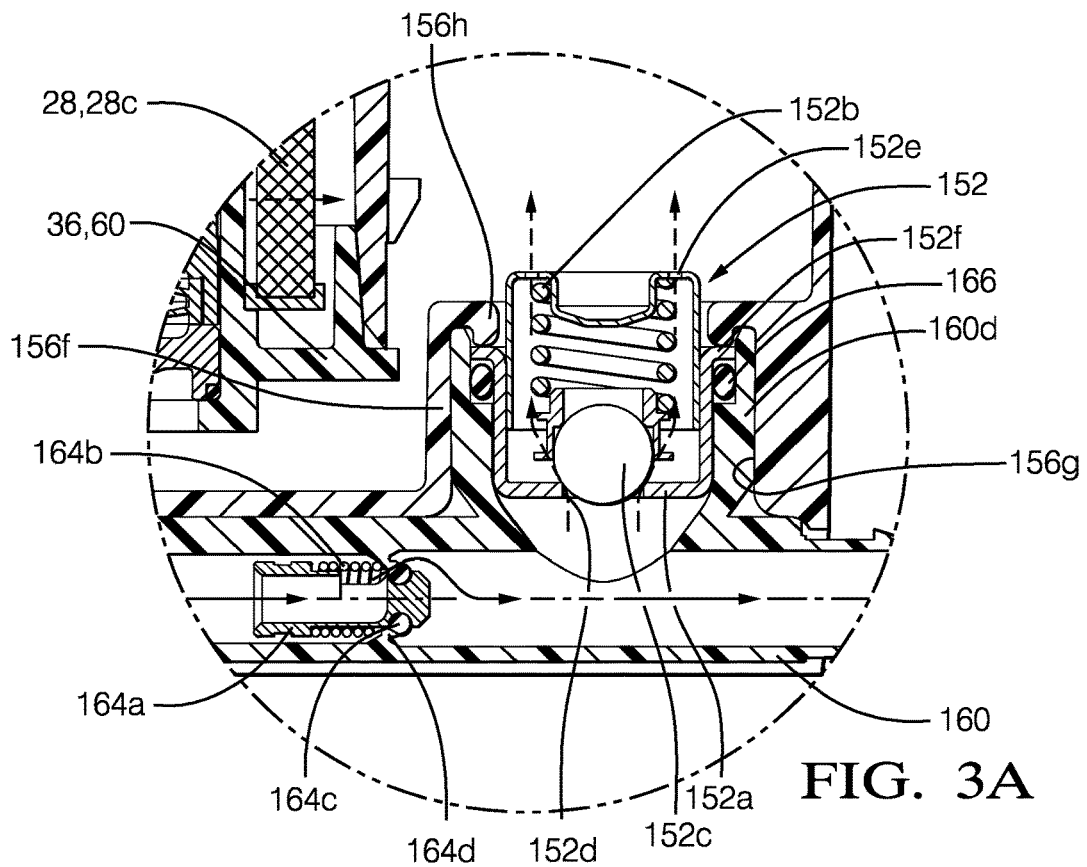
FIG. 3A is an enlargement of circle 3A of FIG. 3.
Figure 3B:
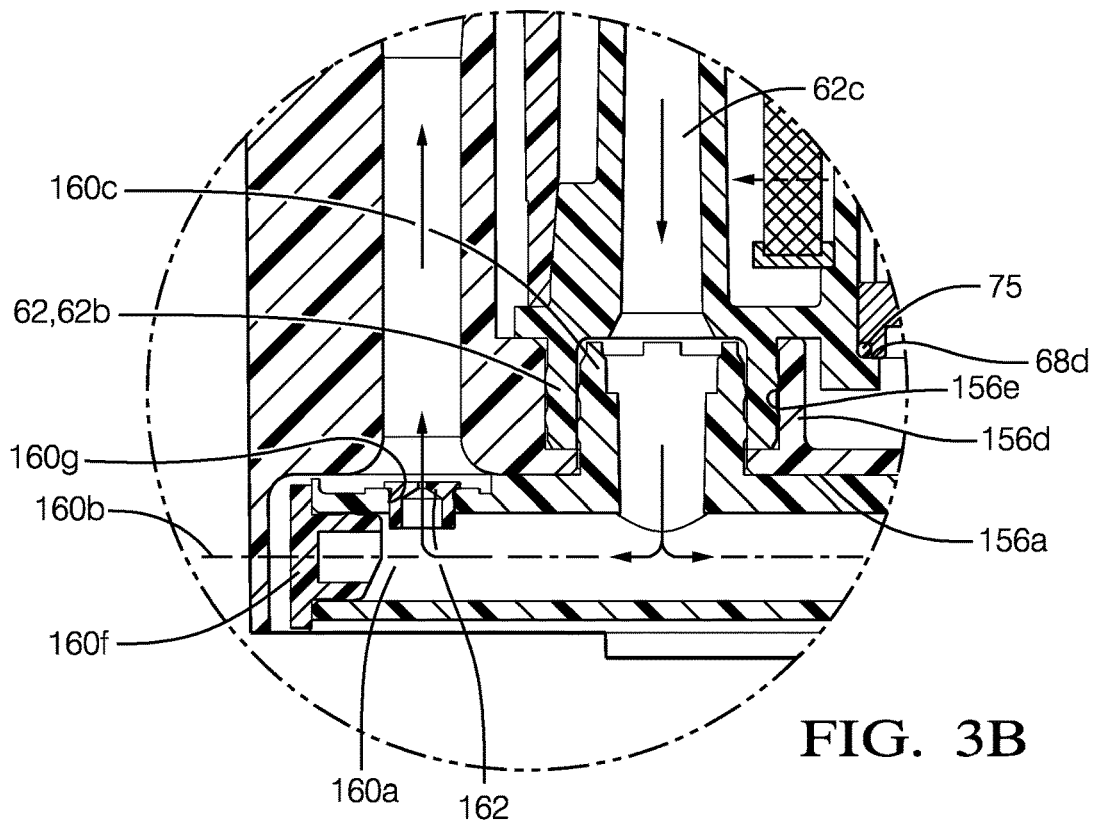
FIG. 3B is an enlargement of circle 3B of FIG. 3.

In addition to FIG. 1, reference will now be made to FIGS. 2-3B which are exploded isometric views and axial cross-sectional views of fuel delivery module 10. Fuel delivery module 10 generally includes a fluid pump and filter assembly 20, herein after referred to as fuel pump and filter assembly 20, and a reservoir assembly 22. While the fluid delivery module has been illustrated as fuel delivery module 10, it should be understood that the invention is not to be limited to a fuel delivery module, but could also be applied to a fluid delivery module which delivers fluids other than fuel.

Fuel pump and filter assembly 20 generally includes a housing 24 which extends along a pump axis 26, a filter 28 located within housing 24, a motor assembly 30 located within housing 24, a pump section 32 within housing 24 which is driven by motor assembly 30 such that motor assembly 30 and pump section 32 define a fluid or fuel pump. Fuel pump and filter assembly 20 will be described in detail in the paragraphs that follow.

Housing 24 includes an upper housing 34 and a lower housing 36 which is secured to upper housing 34 as will be described in greater detail later. Upper housing 34 is substantially cup-shaped and includes an annular upper housing sidewall 34a which surrounds pump axis 26 and extends from an upper housing first end 34b to an upper housing second end 34c such that upper housing first end 34b is closed by lower housing 36 while upper housing second end 34c is closed by an upper housing end wall 34d. Lower housing 36 is attached to upper housing first end 34b, thereby defining a housing interior volume 38 within housing 24. Upper housing 34 and lower housing 36 may each preferably be made of a plastic material in an injection molding process which allows features that will be subsequently described to be net-formed. Furthermore, one or both of upper housing 34 and lower housing 36 may be made of an electrically conductive material and electrically grounded in order to prevent build-up of electrostatic charge in use.

Upper housing 34 defines a first brush compartment 40 and a second brush compartment 42 by including a brush compartment wall 44 which extends axially into housing interior volume 38 from upper housing end wall 34d such that a brush compartment dividing wall 46 traverses the interior perimeter of brush compartment dividing wall 46, thereby separating first brush compartment 40 and second brush compartment 42. First brush compartment 40 and second brush compartment 42 will be described in greater detail later.

Upper housing 34 also defines an upper housing filter mount 48 which extends axially into housing interior volume 38 from upper housing end wall 34d. Upper housing filter mount 48 is annular in shape and is centered about pump axis 26 such that upper housing filter mount 48 circumferentially surrounds brush compartment wall 44 of first brush compartment 40 and second brush compartment 42. Upper housing filter mount 48 is used to secure filter 28 within housing 24 as will be discussed in greater detail later.

Upper housing 34 also defines a first inductor compartment 50 and a second inductor compartment 52 by including an inductor compartment wall 54 which extends axially from the side of upper housing end wall 34d that is opposite brush compartment wall 44 such that an inductor compartment dividing wall 56 extends axially from upper housing end wall 34d and traverses the interior perimeter of inductor compartment wall 54, thereby separating first inductor compartment 50 and second inductor compartment 52. First inductor compartment 50 and second inductor compartment 52 are further defined by an inductor compartment cover 58 which is substantially parallel to upper housing end wall 34d and which engages inductor compartment wall 54 and inductor compartment dividing wall 56, thereby enclosing first inductor compartment 50 and second inductor compartment 52 such that first inductor compartment 50 and second inductor compartment 52 are defined axially between upper housing end wall 34d and inductor compartment cover 58. Inductor compartment cover 58 may preferably be made of a plastic material and may be secured to upper housing 34, by way of non-limiting example only, by an interference fit with inductor compartment wall 54, features of inductor compartment wall 54 which interlock with complementary features of inductor compartment cover 58, or by a weld connection. First inductor compartment 50 and second inductor compartment 52 will be discussed in greater detail later.

Lower housing 36 includes a lower housing end wall 60 which spans across upper housing first end 34b, thereby closing off upper housing 34 at upper housing first end 34b. Lower housing 36 also includes a lower housing outlet tube 62 which extends through lower housing end wall 60. Lower housing outlet tube 62 has a lower housing outlet tube first section 62a which extends from lower housing end wall 60 into housing interior volume 38 such that lower housing outlet tube 62 is located radially between filter 28 and upper housing sidewall 34a. Lower housing outlet tube 62 also has a lower housing outlet tube second section 62b which extends from lower housing end wall 60 in the opposite direction as lower housing outlet tube first section 62a. Lower housing outlet tube 62 defines a lower housing outlet tube passage 62c which extends through lower housing outlet tube first section 62a and lower housing outlet tube second section 62b, thereby providing a flow path out of housing interior volume 38.

Lower housing 36 also includes a lower housing attachment wall 64 which extends axially from lower housing end wall 60 in the same direction as lower housing outlet tube first section 62a. Lower housing attachment wall 64 is spaced radially inward from the outer perimeter of lower housing end wall 60, thereby defining a lower housing attachment shoulder 66 which is substantially perpendicular to pump axis 26 and which abuts upper housing first end 34b. The outer perimeter of lower housing attachment wall 64 is shaped to complement the portion of the inner perimeter of upper housing sidewall 34a which surrounds lower housing attachment wall 64, thereby allowing a fluid-tight connection to be made between upper housing sidewall 34a and lower housing attachment wall 64, by way of non-limiting example only, with a weld connection or an adhesive connection.

Lower housing 36 also includes a lower housing pump section wall 68 which extends axially from lower housing end wall 60 in the same direction as lower housing outlet tube first section 62a into housing interior volume 38 such that lower housing pump section wall 68 is annular in shape and is centered about pump axis 26. The outer perimeter of lower housing pump section wall 68 defines a filter shoulder 68a which is substantially perpendicular to pump axis 26 such that filter 28 abuts filter shoulder 68a. A plurality of pump section retention apertures 68b extend radially through lower housing pump section wall 68 such that pump section retention apertures 68b are circumferentially spaced around lower housing pump section wall 68 near the free end of lower housing pump section wall 68, i.e. the end of lower housing pump section wall 68 that is distal from lower housing pump section wall 68. Pump section retention apertures 68b are used to retain motor assembly 30 to lower housing 36 as will be described in greater detail later. A pump section bore 68c is defined by lower housing pump section wall 68 and extends through lower housing end wall 60 such that pump section bore 68c is centered about pump axis 26 and is stepped in diameter, thereby defining a pump section bore shoulder 68d which is substantially perpendicular to pump axis 26 facing toward pump section 32 and which supports pump section 32 as will be described in greater detail later.

Pump section 32 is located within pump section bore 68c and includes an inlet plate 70, an impeller 72, and an outlet plate 74. Inlet plate 70 is disposed at the end of pump section bore 68c that is proximal to pump section bore shoulder 68d while outlet plate 74 is disposed at the end of pump section bore 68c that is distal from pump section bore shoulder 68d. A seal 75, illustrated as a gasket, may be located axially between pump section bore shoulder 68d and inlet plate 70, thereby substantially preventing fuel from entering housing 24 through the interface of housing 24 and pump section 32. Seal 75 is resilient and compliant, thereby causing seal 75 to apply an axial force to inlet plate 70. Both inlet plate 70 and outlet plate 74 are fixed relative to housing 24 to prevent relative movement between inlet plate 70 and outlet plate 74 with respect to housing 24 as will be described in greater detail later.

Outlet plate 74 defines a spacer ring 76 on the side of outlet plate 74 that faces toward inlet plate 70. Impeller 72 is disposed axially between inlet plate 70 and outlet plate 74 such that impeller 72 is radially surrounded by spacer ring 76. Impeller 72 is rotationally coupled to motor assembly 30 as will be described in greater detail later such that motor assembly 30 causes impeller 72 to rotate about pump axis 26 in use. Spacer ring 76 is dimensioned to be slightly thicker than the dimension of impeller 72 in the direction of pump axis 26, i.e. the dimension of spacer ring 76 in the direction of pump axis 26 is greater than the dimension of impeller 72 in the direction of pump axis 26. In this way, inlet plate 70, outlet plate 74, and spacer ring 76 are fixed within housing 24, as will be described in greater detail later. Axial forces created by seal 75 are carried by spacer ring 76, thereby preventing impeller 72 from being clamped tightly between inlet plate 70 and outlet plate 74 which would prevent impeller 72 from rotating freely. Spacer ring 76 is also dimensioned to have an inside diameter that is larger than the outside diameter of impeller 72 to allow impeller 72 to rotate freely within spacer ring 76 and axially between inlet plate 70 and outlet plate 74. While spacer ring 76 is illustrated as being made integrally as a single piece with outlet plate 74, it should be understood that spacer ring 76 may alternatively be made as a separate piece that is captured axially between outlet plate 74 and inlet plate 70.

Inlet plate 70 is generally cylindrical in shape, and includes an inlet 78 that extends through inlet plate 70 in the same direction as pump axis 26. Inlet 78 is a passage which introduces fuel into fuel pump and filter assembly 20, i.e. housing interior volume 38. Inlet plate 70 also includes an inlet plate flow channel 80 formed in the face of inlet plate 70 that faces toward impeller 72 such that inlet plate flow channel 80 is in fluid communication with inlet 78. While not shown, inlet 78 may be connected to a strainer which prevents foreign matter that may be present in the fuel from entering inlet 78.

Outlet plate 74 is generally cylindrical in shape and includes an outlet plate outlet passage 82 that extends through outlet plate 74 in the same direction as pump axis 26. Outlet plate 74 also includes an outlet plate flow channel 84 formed in the face of outlet plate 74 that faces toward impeller 72 such that outlet plate flow channel 84 is in fluid communication with outlet plate outlet passage 82. Outlet plate 74 also includes an outlet plate aperture, hereinafter referred to as lower bearing 86, extending through outlet plate 74. A motor shaft 88 of motor assembly 30 extends through lower bearing 86 in a close fitting relationship such that motor shaft 88 is able to rotate freely within lower bearing 86 and such that radial movement of motor shaft 88 within lower bearing 86 is substantially prevented. In this way, lower bearing 86 radially supports a lower end 89 of motor shaft 88 that is proximal to pump section 32. Lower end 89 of motor shaft 88 is also coupled to impeller 72 in order to prevent relative rotation between motor shaft 88 and impeller 72.

Impeller 72 includes a plurality of blades 90 arranged in a polar array radially surrounding and centered about pump axis 26 such that blades 90 are aligned with inlet plate flow channel 80 and outlet plate flow channel 84. Blades 90 are each separated from each other by a blade chamber 92 that passes through impeller 72 in the general direction of pump axis 26. Impeller 72 may be made, for example only, by a plastic injection molding process in which the preceding features of impeller 72 are integrally molded as a single piece of plastic.

Motor assembly 30 will now be described with continued reference to FIGS. 2-3B. Motor assembly 30 generally includes a rotor or armature 94 with a plurality of circumferentially spaced motor windings 96, a commutator portion 98, and motor shaft 88 which extends axially from each end of armature 94; a motor frame 100; a pair of permanent magnets 102 which are each in the shape of a segment of a hollow cylinder; a flux carrier 104; a first carbon brush 106; and a second carbon brush 108. Each element of motor assembly 30 will be described in greater detail in the paragraphs that follow.

Motor frame 100 includes a top section 110 that is proximal to upper housing end wall 34d, a plurality of circumferentially spaced legs 112 extending axially from top section 110 toward pump section 32, and a base section 114 axially spaced apart from top section 110 by legs 112 such that base section 114 is attached to lower housing pump section wall 68 as will be described in greater detail later. Top section 110, legs 112, and base section 114 are preferably integrally formed from a single piece of plastic, for example only, by a plastic injection molding process.

Top section 110 of motor frame 100 defines a first carbon brush holder 116 extending axially therefrom within which first carbon brush 106 is disposed and also defines a second carbon brush holder 118 extending axially therefrom within which second carbon brush 108 is disposed. First carbon brush holder 116 is located within first brush compartment 40 of upper housing 34 while second carbon brush holder 118 is located within second brush compartment 42 of upper housing 34. A first shunt wire 120 is attached at one end thereof to first carbon brush 106 while a second end thereof is attached to a first terminal 122 such that first terminal 122 extends through upper housing end wall 34d from first carbon brush holder 116 to first inductor compartment 50. First terminal 122 is fixed to upper housing 34, for example, by a press fit connection with upper housing end wall 34d. A first brush spring 124 is held in compression axially between first terminal 122 and first carbon brush 106 such that first brush spring 124 is grounded to first terminal 122, and consequently is grounded to upper housing 34, thereby urging first carbon brush 106 into contact with commutator portion 98 of armature 94. It should be noted that first shunt wire 120 is provided with slack between first carbon brush 106 and first terminal 122, thereby allowing first brush spring 124 to maintain contact between first carbon brush 106 and commutator portion 98 as first carbon brush 106 wears in use. Similarly, a second shunt wire 126 is attached at one end thereof to second carbon brush 108 while a second end thereof is attached to a second terminal 128 such that second terminal 128 extends through upper housing end wall 34d from second carbon brush holder 118 to second inductor compartment 52. Second terminal 128 is fixed to upper housing 34, for example, by a press fit connection with upper housing end wall 34d. A second brush spring 130 is held in compression axially between second terminal 128 and second carbon brush 108 such that second brush spring 130 is grounded to second terminal 128, and consequently is grounded to upper housing 34, thereby urging second carbon brush 108 into contact with commutator portion 98 of armature 94. It should be noted that second shunt wire 126 is provided with slack between second carbon brush 108 and second terminal 128, thereby allowing second brush spring 130 to maintain contact between second carbon brush 108 and commutator portion 98 as second carbon brush 108 wears in use.

Top section 110 of motor frame 100 also defines an upper bearing 132 therein which radially supports an upper end 134 of motor shaft 88 that is proximal to upper housing end wall 34d. Motor shaft 88 is able to rotate freely within upper bearing 132 such that radial movement of motor shaft 88 within upper bearing 132 is substantially prevented.

Legs 112 are preferably equally circumferentially spaced around top section 110 and base section 114 and define motor frame openings 136 between legs 112. Motor frame openings 136 extend axially from top section 110 to base section 114. One magnet 102 is disposed within each motor frame opening 136. Magnets 102 may be inserted within respective motor frame openings 136 after motor frame 100 has been formed. Alternatively, magnets 102 may be insert molded with motor frame 100 when motor frame 100 is formed by a plastic injection molding process. In this way, magnets 102 and legs 112 radially surround armature 94. While two legs 112 and two magnets 102 have been illustrated, it should be understood that other quantities of legs 112 and magnets 102 may be used.

Base section 114 may be annular in shape and connects legs 112 to each other. Base section 114 includes a base section bore 138 extending axially thereinto from the end of base section 114 that faces away from top section 110. Base section bore 138 is coaxial with upper bearing 132 and receives outlet plate 74 closely therein such that radial movement of outlet plate 74 within base section bore 138 is substantially prevented. Since base section bore 138 is coaxial with upper bearing 132, a coaxial relationship is maintained between lower bearing 86 and upper bearing 132 by base section 114. The outer perimeter of outlet plate 74 is stepped, thereby defining an outlet plate shoulder 140 which is annular in shape and substantially perpendicular to pump axis 26 such that outlet plate shoulder 140 faces toward motor assembly 30. The axial end of base section 114 abuts outlet plate shoulder 140, thereby limiting the extent to which outlet plate 74 can be inserted into base section bore 138.

A plurality of retention tabs 142 extend radially outward from base section 114 such that each retention tab 142 is received within a respective one of pump section retention apertures 68b. Each retention tab 142 is tapered such that each retention tab 142 diverges from the axial end of retention tab 142 that is proximal to pump section 32 to the axial end of retention tab 142 that is proximal to motor assembly 30, thereby defining a retention tab ramp surface 142a that is oblique to pump axis 26. The axial end of each retention tab 142 that is proximal to motor assembly 30 defines a retention tab shoulder 142b that faces toward upper housing end wall 34d. In this way, when base section 114 is inserted into pump section bore 68c in the direction of pump axis 26, retention tab ramp surfaces 142a of retention tabs 142 resiliently flex lower housing pump section wall 68 radially outward until retention tab shoulders 142b of retention tabs 142 are axially aligned within pump section retention apertures 68b. When retention tab shoulders 142b of retention tabs 142 are axially aligned within pump section retention apertures 68b, lower housing pump section wall 68 is allowed to spring radially inward, thereby capturing retention tabs 142 within pump section retention apertures 68b and consequently preventing base section 114 from backing out of pump section bore 68c and also consequently retaining motor frame 100 to lower housing 36. When retention tabs 142 are captured within pump section retention apertures 68b, pump section 32 and seal 75 are held in compression between pump section bore shoulder 68d and motor frame 100, thereby preventing movement of inlet plate 70 and outlet plate 74 relative to housing 24 and also thereby forming a fluid-tight seal between seal 75 and lower housing 36. The axial compression provided by retention tabs 142 replaces axial compression traditionally provided by a fuel pump shell within which the pump section and motor assembly are located. As described herein motor assembly 30 and pump section 32, i.e. the fuel pump, are supported by lower housing 36 while motor assembly 30 and pump section 32 are not supported by upper housing 34. It should be noted that inconsequential contact may be made between the fuel pump and upper housing 34 while still being considered to not be supported by upper housing 34.

Flux carrier 104 is made of a ferromagnetic material and may take the form of a cylindrical tube. Flux carrier 104 closely radially surrounds legs 112 of motor frame 100 and magnets 102. Flux carrier 104 may be made, for example only, from a sheet of ferromagnetic material formed to shape by a rolling process.

Since motor frame 100 may be made as a single piece, for example only, by a plastic injection molding process, upper bearing 132 and base section bore 138 can be made by a single piece of tooling, thereby allowing a high degree of control over the relative positions of upper bearing 132 and base section bore 138. Consequently, lower bearing 86 can more easily be maintained in a coaxial relationship with upper bearing 132 and motor shaft 88 can more easily be maintained perpendicular to impeller 72. Similarly, since first carbon brush holder 116 and second carbon brush holder 118 may be defined by top section 110, for example only, by an injection molding process, first carbon brush holder 116, second carbon brush holder 118, and upper bearing 132 may be formed by a single piece of tooling, thereby allowing a high degree of control over the relative positions of first carbon brush holder 116, second carbon brush holder 118, and upper bearing 132. Consequently, first carbon brush holder 116 and second carbon brush holder 118 can be easily maintained parallel to pump axis 26 which may be important for first carbon brush 106 and second carbon brush 108 to adequately interface with commutator portion 98 of armature 94. It should be noted that sufficient lateral clearance is provided between first carbon brush holder 116 and first brush compartment 40; between second carbon brush holder 118 and second brush compartment 42; and between pump section 32 and pump section bore 68c to prevent deformation of motor frame 100 which would result in misalignment between lower bearing 86 and upper bearing 132.

A first radio frequency interference (RFI) circuit, illustrated as a first inductor coil 144, is located within first inductor compartment 50 while a second RFI circuit, illustrated as second inductor coil 146, is located within second inductor compartment 52. First inductor coil 144 includes a first conductive coil 144a which is wound around a first ferromagnetic core 144b such that one end of first conductive coil 144a is attached in electrical communication to first terminal 122 while the other end of first conductive coil 144a is attached in electrical communication to a first power lead 144c which passes through inductor compartment wall 54 and which may be either positive or negative in polarity. Similarly, second inductor coil 146 includes a second conductive coil 146a which is wound around a second ferromagnetic core 146b such that one end of second conductive coil 146a is attached in electrical communication to second terminal 128 while the other end of second conductive coil 146a is attached in electrical communication to a second power lead 146c which passes through inductor compartment wall 54 and which is opposite in polarity from first power lead 144c, i.e. if first power lead 144c is positive, then second power lead 146c is negative and if first power lead 144c is negative, then second power lead 146c is positive. In this way, RFI produced by motor assembly 30 may be suppressed in operation. It should be noted that by locating first inductor compartment 50 and second inductor compartment 52 outside of fuel volume 158 rather than within the motor assembly as is traditionally the case, first inductor compartment 50 and second inductor compartment 52 can be easily sized to accommodate first inductor coil 144 and second inductor coil 146 of different sizes to meet the RFI suppression needs without the need to redesign other aspects of fuel pump and filter assembly 20.

As described herein, first brush compartment 40, second brush compartment 42, first inductor compartment 50, second inductor compartment 52, first carbon brush holder 116, and second carbon brush holder 118 provide electrical isolation between the positive and negative circuits, i.e. the conductive paths leading to first carbon brush 106 and second carbon brush 108, which is particularly important when electrically conductive fuels such as fuel containing alcohol are used because without electrical isolation, detrimental corrosion of the positive and negative circuits is possible. More specifically, first brush compartment 40 encloses first carbon brush holder 116, thereby electrically isolating first shunt wire 120 and the portion of first terminal 122 that is located within first carbon brush holder 116. While lateral clearance is provided between first brush compartment 40 and first carbon brush holder 116 as noted previously in order to prevent misalignment between lower bearing 86 and upper bearing 132, the lateral clearance is sufficiently small in order to provide an electrical resistance that is sufficiently high so as to establish electrical isolation of first shunt wire 120 and the portion of first terminal 122 that is located within first carbon brush holder 116. Similarly, second brush compartment 42 encloses second carbon brush holder 118, thereby electrically isolating second shunt wire 126 and the portion of second terminal 128 that is located within second carbon brush holder 118. While lateral clearance is provided between second brush compartment 42 and second carbon brush holder 118 as noted previously in order to prevent misalignment between lower bearing 86 and upper bearing 132, the lateral clearance is sufficiently small in order to provide an electrical resistance that is sufficiently high so as to establish electrical isolation of second shunt wire 126 and the portion of second terminal 128 that is located within second carbon brush holder 118. Furthermore, first inductor compartment 50 which is comprised of upper housing end wall 34d, inductor compartment wall 54, inductor compartment dividing wall 56, and inductor compartment cover 58 electrically isolates the portion of first terminal 122 that is located within first inductor compartment 50, first inductor coil 144, the connection between first terminal 122 and first inductor coil 144, and the connection between first inductor coil 144 and first power lead 144c. Similarly, second inductor compartment 52 which comprises upper housing end wall 34d, inductor compartment wall 54, inductor compartment dividing wall 56, and inductor compartment cover 58 electrically isolates the portion of second terminal 128 that is located within second inductor compartment 52, second inductor coil 146, the connection between second terminal 128 and second inductor coil 146, and the connection between second inductor coil 146 and second power lead 146c. It should be noted that the portions of first power lead 144c and second power lead 146c that are located outside of first inductor compartment 50 and second inductor compartment 52 are covered with an electrical insulation, thereby electrically isolating these portions of first power lead 144c and second power lead 146c. Since each portion of the positive and negative circuits are electrically isolated, detrimental corrosion thereof can be minimized or eliminated.

Filter 28 includes an upper filter frame 28a, a lower filter frame 28b, and a filter medium 28c spanning between upper filter frame 28a and lower filter frame 28b. Upper filter frame 28a is annular in shape such that upper filter frame 28a radially surrounds upper housing filter mount 48 and such that upper filter frame 28a seals against the outer periphery of upper housing filter mount 48, thereby preventing fuel from passing between the interface of upper housing 34 and upper filter frame 28a. Upper filter frame 28a is made of a material that is substantially rigid so as to maintain a desired shape of filter medium 28c, and may be, by way of non-limiting example only, plastic or foam and may be electrically conductive and electrically grounded in order to prevent build-up of electrostatic charge in use. Lower filter frame 28b is annular in shape such that lower filter frame 28b radially surrounds lower housing pump section wall 68 and such that lower filter frame 28b seals against the outer periphery of lower housing pump section wall 68, thereby preventing fuel from passing between the interface of lower filter frame 28b and lower housing 36. As shown, lower filter frame 28b axially abuts filter shoulder 68a. Lower filter frame 28b is made of a material that is substantially rigid so as to maintain a desired shape of filter medium 28c, and may be, by way of non-limiting example only, plastic or foam and may be electrically conductive and electrically grounded in order to prevent build-up of electrostatic charge in use. Filter medium 28c is annular in shape, thereby radially surrounding motor assembly 30. Filter medium 28c is secured to upper filter frame 28a in a fluid-tight manner, by way of non-limiting example only, with an adhesive or by overmolding filter medium 28c with upper filter frame 28a, thereby preventing fuel from passing between the interface of upper filter frame 28a and filter medium 28c. Similarly, filter medium 28c is secured to lower filter frame 28b in a fluid-tight manner, by way of non-limiting example only, with an adhesive or by overmolding filter medium 28c with lower filter frame 28b, thereby preventing fuel from passing between the interface of lower filter frame 28b and filter medium 28c. Filter medium 28c may be any material commonly used for filtering fuel (or other fluid that is being filtered), and may be, by way of non-limiting example only, a pleated cellulose based material configured to allow fuel to flow therethrough while preventing foreign matter of a predetermined sized from passing therethrough. In this way, fuel that has been pumped by pump section 32 must pass radially through filter medium 28c before exiting fuel pump and filter assembly 20 through lower housing outlet tube passage 62c. While not shown, filter 28 may also include one or more supports which extend between upper filter frame 28a and lower filter frame 28b in order to provide axial support to filter 28 in the event that filter medium 28c does not provide sufficient strength in the axial direction.

Reservoir assembly 22 generally includes a fluid reservoir illustrated as fuel reservoir 148, a manifold assembly 150, and a fuel pressure regulator 152. The components of reservoir assembly 22 will be described in detail in the paragraphs that follow.

Fuel reservoir 148 may preferably be made of a plastic material in an injection molding process which integrally forms the features that will be subsequently described. Fuel reservoir 148 includes a fuel reservoir sidewall 154 which surrounds pump axis 26 of fuel pump and filter assembly 20 and which extends axially from a fuel reservoir sidewall first end 154a to a fuel reservoir sidewall second end 154b. Fuel reservoir 148 is oriented within fuel tank 12 such that fuel reservoir sidewall first end 154a is proximal to the top of fuel tank 12, i.e. fuel reservoir sidewall first end 154a faces away from the direction of gravity, and such that fuel reservoir sidewall second end 154b is adjacent to the bottom of fuel tank 12, i.e. fuel reservoir sidewall second end 154b faces toward the direction of gravity. It should be noted that fuel reservoir sidewall 154 is not necessarily centered about pump axis 26. Fuel reservoir 148 also includes a fuel reservoir end wall 156 which traverses the interior of fuel reservoir sidewall 154 at fuel reservoir sidewall second end 154*b*. Fuel reservoir end wall 156 is offset axially from fuel reservoir sidewall first end 154*a* sufficiently far to establish a fuel volume 158 within fuel reservoir sidewall 154 axially between fuel reservoir sidewall first end 154*a* and fuel reservoir end wall 156. As shown, fuel reservoir end wall 156 is offset axially from fuel reservoir sidewall first end 154*a* sufficiently to allow fuel pump and filter assembly 20 to be located entirely within fuel volume 158, however, a portion fuel pump and filter assembly 20 may alternatively extend out of fuel volume 158 at fuel reservoir sidewall first end 154*a*.

Fuel reservoir end wall 156 includes a fuel reservoir end wall recess 156*a* which extends toward fuel reservoir sidewall first end 154*a* such that fuel reservoir end wall recess 156*a* is sized to accommodate manifold assembly 150 therewithin. Fuel reservoir end wall 156 also includes a fuel volume inlet tube 156*b* which extends axially therefrom into fuel volume 158 such that a fuel volume inlet passage 156*c* is defined axially through fuel reservoir end wall recess 156*a* and fuel volume inlet tube 156*b*. Fuel volume inlet tube 156*b* is used to fill fuel volume 158 with fuel from fuel tank 12 when the level of fuel within fuel tank 12 is below fuel reservoir sidewall first end 154*a* as will be described in greater detail later. Fuel reservoir end wall 156 also includes a fuel pump to manifold tube 156*d* which extends axially therefrom into fuel volume 158 such that a fuel pump to manifold passage 156*e* is defined axially through fuel reservoir end wall recess 156*a* and fuel pump to manifold tube 156*d*. Fuel pump to manifold tube 156*d* is used to facilitate communication of fuel from lower housing outlet tube passage 62*c* to manifold assembly 150 as will be described in greater detail later. Fuel reservoir end wall 156 also includes a fuel pressure regulator tube 156*f* which extends axially therefrom into fuel volume 158 such that a fuel pressure regulator passage 156*g* is defined axially through fuel reservoir end wall recess 156*a* and fuel pressure regulator tube 156*f*. A fuel pressure regulator retention flange 156*h* extends radially inward from the free end of fuel pressure regulator tube 156*f*, i.e. the end of fuel pressure regulator tube 156*f* that is distal from fuel reservoir end wall 156. Fuel pressure regulator tube 156*f* is used to house fuel pressure regulator 152 and to facilitate communication of fuel from manifold assembly 150 to fuel volume 158 via fuel pressure regulator 152 as will be described in greater detail later.

Manifold assembly 150 generally includes a fuel manifold 160, a jet pump orifice 162, and a check valve assembly 164. Fuel manifold 160 may preferably be made of a plastic material in an injection molding process which integrally forms the features that will be subsequently described. Furthermore, fuel manifold 160 may be electrically conductive and electrically grounded in order to prevent build-up of electrostatic charge in use Fuel manifold 160 is hollow and defines a fuel manifold volume 160*a* therein along a fuel manifold axis 160*b* which is substantially perpendicular to pump axis 26. A fuel manifold inlet tube 160*c* extends radially outward from fuel manifold 160 such that the outer periphery of fuel manifold inlet tube 160*c* is sealingly received within the inner periphery of lower housing outlet tube second section 62*b*, thereby preventing fuel from passing between the interface of fuel manifold inlet tube 160*c* and lower housing outlet tube second section 62*b*. Furthermore, the outer periphery of fuel manifold inlet tube 160*c* may be received within the inner periphery of lower housing outlet tube second section 62*b* in a press fit relationship which retains fuel manifold 160 to lower housing 36. Lower housing outlet tube second section 62*b* is sealingly received with the inner periphery of fuel pump to manifold passage 156*e*, thereby communicating fuel from lower housing outlet tube passage 62*c* to fuel manifold volume 160*a*. A fuel manifold regulator tube 160*d* extends radially outward from fuel manifold 160 such that the outer periphery of fuel manifold regulator tube 160*d* is sealingly received within fuel pressure regulator passage 156*g*, thereby preventing fuel from passing between the interface of fuel manifold regulator tube 160*d* and fuel pressure regulator passage 156*g*. Furthermore, the outer periphery of fuel manifold regulator tube 160*d* may be received within fuel pressure regulator passage 156*g* in a press fit relationship which retains fuel manifold 160 to fuel reservoir 148. Fuel pressure regulator 152 is disposed within fuel manifold regulator tube 160*d* as will be described in greater detail later. A fuel manifold outlet 160*e* is located at one end of fuel manifold 160 such that fuel manifold outlet 160*e* is placed in fluid communication with fuel rail 16 of internal combustion engine 14 in order to communicate fuel from fuel manifold 160 to internal combustion engine 14 in operation while a fuel manifold end cap 160*f* seals off the other end of fuel manifold 160.

Check valve assembly 164 is located within fuel manifold volume 160*a* between fuel manifold inlet tube 160*c* and fuel manifold regulator tube 160*d*. Check valve assembly 164 is configured to prevent fuel from back-flowing from fuel manifold outlet 160*e* to lower housing outlet tube passage 62*c* of fuel pump and filter assembly 20 while allowing fuel to flow from lower housing outlet tube passage 62*c* of fuel pump and filter assembly 20 to fuel manifold outlet 160*e*. As embodied herein, check valve assembly 164 includes a check valve body 164*a*, a check valve spring 164*b*, a check valve sealing ring 164*c*, and a check valve seat 164*d* which is formed integrally with fuel manifold 160 between fuel manifold inlet tube 160*c* and fuel manifold outlet 160*e*. Check valve body 164*a* extends through check valve seat 164*d* such that check valve sealing ring 164*c* is attached to check valve body 164*a* on the side of check valve seat 164*d* that is downstream of check valve seat 164*d*, i.e. the side of check valve seat 164*d* that faces toward fuel manifold outlet 160*e*. Check valve spring 164*b* biases check valve check valve body 164*a* in a direction that urges check valve sealing ring 164*c* toward check valve seat 164*d*. In operation, when fuel pump and filter assembly 20 is pumping fuel, fuel coming from lower housing outlet tube passage 62*c* compresses check valve spring 164*b*, thereby lifting check valve sealing ring 164*c* from check valve seat 164*d* and allowing fuel to flow from lower housing outlet tube passage 62*c* to fuel manifold outlet 160*e*. Conversely, when fuel pump and filter assembly 20 is not pumping fuel, check valve spring 164*b* urges check valve sealing ring 164*c* into engagement with check valve seat 164*d*, thereby preventing fuel from back-flowing past check valve seat 164*d*. Check valve spring 164*b* may be further designed to act as a poppet valve which requires a predetermined pressure from fuel pump and filter assembly 20 to open, thereby allowing check valve assembly 164 to perform its reverse and forward flow checking functions. It should be noted that check valve assembly 164 is located between jet pump orifice 162 and fuel manifold outlet tube 160*e*, thereby allowing check valve assembly 164 to prevent fuel from draining out of fuel tank 12 in the event of the fuel line being disconnected or otherwise opened downstream of fuel tank 12 fuel when pump and filter assembly 20 is not operating.

Jet pump orifice 162 is disposed within a fuel manifold jet pump aperture 160g which extends radially outward through fuel manifold 160 such that fuel manifold jet pump aperture 160g is aligned with fuel volume inlet passage 156c, thereby causing jet pump orifice 162 to be aligned with fuel volume inlet passage 156c. It should be noted that jet pump orifice 162 is located on the same side of check valve seat 164d as fuel manifold inlet tube 160c. Jet pump orifice 162 is sized to spray fuel therethrough at a low volume, but a high velocity, into fuel volume inlet passage 156c. Fuel volume inlet passage 156c is not sealed to fuel manifold 160, and consequently, the lower end of fuel volume inlet passage 156c is exposed to fuel within fuel tank 12. The velocity of fuel from jet pump orifice 162 is sufficiently high to create a venturi effect, thereby drawing fuel from fuel tank 12 through fuel volume inlet passage 156c and into fuel volume 158 of fuel reservoir 148 and also thereby keeping fuel volume 158 full of fuel when the fuel level within fuel tank 12 is lower than fuel reservoir sidewall first end 154a.

Fuel pressure regulator 152 generally includes a fuel pressure regulator housing 152a which may be a two-piece assembly as shown, a fuel pressure regulator spring 152b, and a fuel pressure regulator valve member 152c. Fuel pressure regulator housing 152a is hollow and defines a fuel pressure regulator inlet 152d at one end thereof that is proximal to fuel manifold 160 and a fuel pressure regulator outlet 152e at the other end thereof that is distal from fuel manifold 160. Fuel pressure regulator 152 is located within fuel manifold regulator tube 160d such that fuel pressure regulator inlet 152d is in constant fluid communication with fuel manifold volume 160a. Fuel pressure regulator spring 152b and fuel pressure regulator valve member 152c are located within fuel pressure regulator 152 such that fuel pressure regulator spring 152b biases fuel pressure regulator valve member 152c toward fuel pressure regulator inlet 152d. Fuel pressure regulator spring 152b is configured to cause fuel pressure regulator valve member 152c to close fuel pressure regulator inlet 152d when the fuel pressure within fuel manifold volume 160a is at or below a predetermined pressure and to open fuel pressure regulator inlet 152d when the fuel pressure within fuel manifold volume 160a exceeds the predetermined pressure. Consequently, when fuel pressure regulator inlet 152d is open, a portion of the fuel in fuel manifold volume 160a is passed through fuel pressure regulator 152 via fuel pressure regulator outlet 152e, thereby maintaining a substantially constant fuel pressure within fuel manifold volume 160a and subsequently within fuel rail 16 as well. A fuel pressure regulator flange 152f extends radially outward from fuel pressure regulator housing 152a which axially abuts fuel pressure regulator retention flange 156h of fuel reservoir end wall 156, thereby retaining fuel pressure regulator 152. An O-ring 166 may be disposed radially between fuel pressure regulator 152 and fuel pressure regulator passage 156g, thereby preventing fuel from passing between the interface of fuel pressure regulator 152 and fuel manifold 160. It should be noted that fuel pressure regulator 152 is downstream of check valve assembly 164, thereby allowing fuel pressure regulator 152 to act as pressure relief valve in the event that fuel pressure within fuel rail 16 increases when internal combustion engine 14 is not running. An increase in fuel pressure within fuel rail 16 when internal combustion engine 14 is not running may occur, by way of non-limiting example only, due to a rise in temperature of the fuel within fuel rail 16 or the fuel line leading thereto which causes thermal expansion of the fuel.

In operation, inlet 78 is exposed to fuel volume 158 which contains fuel to be pumped to internal combustion engine 14. An electric current is supplied to motor windings 96 in order to rotate motor shaft 88 and impeller 72. As impeller 72 rotates, fuel is drawn through inlet 78 into inlet plate flow channel 80. Blade chambers 92 allow fuel from inlet plate flow channel 80 to flow to outlet plate flow channel 84. Impeller 72 subsequently discharges the fuel through outlet plate outlet passage 82 and consequently the fuel flows around motor assembly 30 and radially outward through filter 28. After passing through filter 28, the fuel passes through lower housing outlet tube 62 and into fuel manifold volume 160a. A portion of the fuel from fuel manifold volume 160a is passed through jet pump orifice 162 and is directed into fuel volume inlet tube 156b which causes fuel to be drawn into fuel volume 158 from fuel tank 12 via fuel volume inlet tube 156b. Another portion of the fuel from fuel manifold volume 160a opens check valve assembly 164 thereby allowing fuel to flow out of fuel manifold outlet 160e to internal combustion engine 14. As mentioned previously, if the pressure within fuel manifold volume 160a exceeds the predetermined pressure, fuel is allowed to flow through fuel pressure regulator 152 to fuel volume 158, thereby maintaining a substantially constant pressure in fuel rail 16. It should be noted that lower housing outlet tube first section 62a extends sufficiently far into housing interior volume 38 in order to prevent all of the fuel within housing interior volume 38 from draining out of housing interior volume 38 through jet pump orifice 162 when fuel pump and filter assembly 20 is not pumping fuel. Lower housing outlet tube first section 62a may preferably extend at least half way into housing interior volume 38 in order to ensure a sufficient volume of fuel remains within housing interior volume 38. Similarly, fuel volume inlet tube 156b extends sufficiently far into fuel volume 158 in order to prevent all of the fuel within fuel volume 158 from draining out of fuel volume 158 through jet pump orifice 162. It should be noted that unlabeled arrows have been included throughout FIGS. 3-3b in order to show the path taken by the fuel in operation.

While this invention has been described in terms of preferred embodiments thereof, it is not intended to be so limited, but rather only to the extent set forth in the claims that follow.

We claim:

1. A fluid delivery module comprising:
a housing extending along a pump axis such that said housing defines a housing interior volume, said housing defining a first brush compartment and a second brush compartment within said housing interior volume;
an inlet which introduces fluid into said housing interior volume;
an outlet which discharges fluid from said housing interior volume;
a fluid pump within said housing interior volume, said fluid pump having a pump section and a motor assembly which rotates about said pump axis such that rotation of said motor assembly causes said pump section to pump fuel from said inlet to said outlet, wherein said motor assembly receives electric power through a first carbon brush and a second carbon brush such that said first carbon brush is received within a first carbon brush holder of said motor assembly and said second carbon brush is received within a second carbon brush holder of said motor assembly; and a filter within said housing interior volume which circumferentially surrounds said fluid pump such that fluid that is pumped from said inlet to said outlet passes through said filter;

wherein said first brush compartment encloses said first carbon brush holder and said second brush compartment encloses said second carbon brush holder, thereby electrically isolating said first carbon brush and said second carbon brush;

wherein said housing includes an upper housing and a lower housing, said upper housing comprising:
an upper housing sidewall which surrounds said pump axis and extends from an upper housing first end to an upper housing second end; and
an upper housing end wall which closes said upper housing second end;
wherein said lower housing is fixed to said upper housing first end such that said lower housing closes said upper housing first end;

wherein a first terminal extends through said upper housing end wall from said first carbon brush holder such that a first shunt wire provides electrical communication between said first terminal and said first carbon brush;

wherein a second terminal extends through said upper housing end wall from said second carbon brush holder such that a second shunt wire provides electrical communication between said second terminal and said second carbon brush; and wherein a first inductor compartment and a second inductor compartment are defined on said upper housing end wall outside of said housing interior volume.

2. A fluid delivery module as in claim 1 wherein said first inductor compartment and said second inductor compartment are defined by an inductor compartment wall which extends axially from said upper housing end wall.

3. A fluid delivery module as in claim 2 wherein said first inductor compartment and said second inductor compartment are further defined by an inductor compartment dividing wall which traverses an interior perimeter of said inductor compartment wall such that said inductor compartment dividing wall extends axially from said upper housing end wall.

4. A fluid delivery module as in claim 3 wherein said first inductor compartment and said second inductor compartment are further defined by an inductor compartment cover which engages said inductor compartment wall such that said first inductor compartment and said second inductor compartment are defined axially between said upper housing end wall and said inductor compartment cover.

5. A fluid delivery module as in claim 4 wherein:
a first RFI circuit is located within said first inductor compartment and a second RFI circuit is located within said second inductor compartment such that said first RFI circuit and said second RFI circuit suppress RFI generated by said motor assembly in use; and
wherein said first inductor compartment encloses said first RFI circuit and said second inductor compartment encloses said second inductor compartment, thereby electrically isolating said first RFI circuit and said second RFI circuit.

6. A fluid delivery module as in claim 5 wherein:
said first RFI circuit is electrically connected to said first terminal; and
said second RFI circuit is electrically connected to said second terminal.

7. A fluid delivery module as in claim 5 wherein:
a connection between a first power lead and said first RFI circuit is located within said first inductor compartment; and
a connection between a second power lead and said second RFI circuit is located within said second inductor compartment.

8. A fluid delivery module comprising:
a housing extending along a pump axis such that said housing defines a housing interior volume, said housing defining a first brush compartment and a second brush compartment within said housing interior volume;
an inlet which introduces fluid into said housing interior volume;
an outlet which discharges fluid from said housing interior volume;
a fluid pump within said housing interior volume, said fluid pump having a pump section and a motor assembly which rotates about said pump axis such that rotation of said motor assembly causes said pump section to pump fuel from said inlet to said outlet, wherein said motor assembly receives electric power through a first carbon brush and a second carbon brush such that said first carbon brush is received within a first carbon brush holder of said motor assembly and said second carbon brush is received within a second carbon brush holder of said motor assembly; and
a filter within said housing interior volume which circumferentially surrounds said fluid pump such that fluid that is pumped from said inlet to said outlet passes through said filter;
wherein said first brush compartment encloses said first carbon brush holder and said second brush compartment encloses said second carbon brush holder, thereby electrically isolating said first carbon brush and said second carbon brush;
wherein said housing includes an upper housing and a lower housing, said upper housing comprising:
an upper housing sidewall which surrounds said pump axis and extends from an upper housing first end to an upper housing second end; and
an upper housing end wall which closes said upper housing second end;
wherein said lower housing is fixed to said upper housing first end such that said lower housing closes said upper housing first end;
wherein an upper housing filter mount extends axially into said housing interior volume from said upper housing end wall such that said filter seals against said upper housing filter mount; and
wherein said lower housing includes a lower housing end wall which spans across said upper housing first end of said upper housing, said lower housing end wall having a lower housing pump section wall which extends axially from said lower housing end wall into said housing interior volume such that said filter seals against said lower housing pump section wall.

9. A fluid delivery module as in claim 8 wherein said filter seals against an outer periphery of said lower housing pump section wall.

10. A fluid delivery module comprising:
a housing extending along a pump axis such that said housing defines a housing interior volume, said housing defining a first brush compartment and a second brush compartment within said housing interior volume;
an inlet which introduces fluid into said housing interior volume;

an outlet which discharges fluid from said housing interior volume;

a fluid pump within said housing interior volume, said fluid pump having a pump section and a motor assembly which rotates about said pump axis such that rotation of said motor assembly causes said pump section to pump fuel from said inlet to said outlet, wherein said motor assembly receives electric power through a first carbon brush and a second carbon brush such that said first carbon brush is received within a first carbon brush holder of said motor assembly and said second carbon brush is received within a second carbon brush holder of said motor assembly; and a filter within said housing interior volume which circumferentially surrounds said fluid pump such that fluid that is pumped from said inlet to said outlet passes through said filter;

wherein said first brush compartment encloses said first carbon brush holder and said second brush compartment encloses said second carbon brush holder, thereby electrically isolating said first carbon brush and said second carbon brush;

wherein said housing includes an upper housing and a lower housing, said upper housing comprising:

an upper housing sidewall which surrounds said pump axis and extends from an upper housing first end to an upper housing second end; and an upper housing end wall which closes said upper housing second end;

wherein said lower housing is fixed to said upper housing first end such that said lower housing closes said upper housing first end;

wherein said motor assembly comprises:

a motor frame having a top section which defines said first carbon brush holder and said second carbon brush holder, a base section, and a plurality of legs axially separating said top section and said base section and defining a plurality of motor frame openings spaced circumferentially therebetween;

an armature with a motor shaft which rotates about said pump axis; and a plurality of magnets, wherein each one of said plurality of magnets is disposed within a respective one of said plurality of motor frame openings;

wherein said motor frame is fixed to said lower housing such that said lower housing supports said motor assembly within said housing interior volume.

* * * * *